United States Patent
High et al.

(10) Patent No.: US 10,625,941 B2
(45) Date of Patent: Apr. 21, 2020

(54) DISTRIBUTED AUTONOMOUS ROBOT SYSTEMS AND METHODS

(71) Applicant: Walmart Apollo, LLC, Bentonville, AR (US)

(72) Inventors: Donald High, Noel, MO (US); David Winkle, Bella Vista, AR (US); Brian Gerard McHale, Oldham (GB); Todd Davenport Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 156 days.

(21) Appl. No.: 15/880,706

(22) Filed: Jan. 26, 2018

(65) Prior Publication Data

US 2018/0215544 A1    Aug. 2, 2018

Related U.S. Application Data

(60) Provisional application No. 62/452,112, filed on Jan. 30, 2017.

(51) Int. Cl.

| G06F 7/00 | (2006.01) |
|---|---|
| B65G 1/137 | (2006.01) |
| G06K 7/14 | (2006.01) |
| B25J 9/16 | (2006.01) |
| G05D 1/00 | (2006.01) |

(Continued)

(52) U.S. Cl.
CPC ............ *B65G 1/1375* (2013.01); *B25J 9/163* (2013.01); *B25J 9/1669* (2013.01); *B25J 9/1697* (2013.01); *B65G 1/1371* (2013.01); *G05D 1/0088* (2013.01); *G06K 7/1413* (2013.01); *G06K 7/1417* (2013.01); *G06Q 10/087* (2013.01);

(Continued)

(58) Field of Classification Search
None
See application file for complete search history.

(56) References Cited

U.S. PATENT DOCUMENTS

| 6,535,793 B2 | 3/2003 | Allard |
|---|---|---|
| 6,584,375 B2 | 6/2003 | Bancroft et al. |

(Continued)

FOREIGN PATENT DOCUMENTS

| WO | 2016014917 A1 | 1/2016 |
|---|---|---|
| WO | 2016130849 A1 | 8/2016 |

OTHER PUBLICATIONS

Lowe's Introduces Robot Shopping Assistant, http://www.botmag.com/lowesintroducesrobotshoppingassistant/, last viewed Sep. 9, 2016.

(Continued)

*Primary Examiner* — Yolanda R Cumbess
(74) *Attorney, Agent, or Firm* — McCarter & English, LLP; David R. Burns (57) ABSTRACT

Described in detail herein is an automated fulfillment system including a computing system programmed to receive requests from disparate sources for physical objects disposed at one or more locations in a facility. The computing system can combine the requests, and group the physical objects in the requests based on object types or expected object locations. Autonomous robot devices can receive instructions from the computing system to retrieve a group of the physical objects and deposit the physical objects in storage containers.

20 Claims, 7 Drawing Sheets

(51) Int. Cl.
*G06Q 10/08* (2012.01)
*G06Q 50/28* (2012.01)

(52) U.S. Cl.
CPC ............. *G06Q 50/28* (2013.01); *Y10S 901/01* (2013.01); *Y10S 901/47* (2013.01)

(56) References Cited

U.S. PATENT DOCUMENTS

| | | | |
|---|---|---|---|
| 7,516,848 | B1 | 4/2009 | Shakes et al. |
| 7,693,757 | B2 | 4/2010 | Zimmerman |
| 7,894,939 | B2 | 2/2011 | Zini et al. |
| 8,204,624 | B2 | 6/2012 | Zini et al. |
| 8,594,834 | B1 | 11/2013 | Clark et al. |
| 8,892,241 | B2 | 11/2014 | Weiss |
| 9,050,723 | B1 | 6/2015 | Elazary et al. |
| 9,120,622 | B1 | 9/2015 | Elazary et al. |
| 9,129,251 | B2 | 9/2015 | Davidson |
| 9,205,886 | B1 | 12/2015 | Hickman et al. |
| 9,230,387 | B2 | 1/2016 | Stiernagle |
| 9,262,741 | B1 | 2/2016 | Williams et al. |
| 9,327,397 | B1 | 5/2016 | Williams et al. |
| 9,367,830 | B2 | 6/2016 | Keller et al. |
| 9,409,664 | B1 | 8/2016 | Vliet et al. |
| 9,785,911 | B2 * | 10/2017 | Galluzzo .................. B25J 5/007 |
| 2005/0238465 | A1 | 10/2005 | Razumov |
| 2007/0098264 | A1 | 5/2007 | Van Lier et al. |
| 2008/0077511 | A1 | 3/2008 | Zimmerman |
| 2010/0066497 | A1 | 3/2010 | Lim et al. |
| 2010/0114363 | A1 | 5/2010 | Cardoni |
| 2013/0145299 | A1 | 6/2013 | Steimle et al. |
| 2013/0238111 | A1 | 9/2013 | Whipple et al. |
| 2013/0262251 | A1 | 10/2013 | Wan et al. |
| 2013/0317642 | A1 * | 11/2013 | Asaria ..................... G06Q 10/08 |
| | | | 700/216 |
| 2014/0088764 | A1 | 3/2014 | Naidu et al. |
| 2014/0088939 | A1 | 3/2014 | Garant |
| 2014/0152507 | A1 | 6/2014 | McAllister |
| 2014/0180479 | A1 | 6/2014 | Argue et al. |
| 2014/0244026 | A1 | 8/2014 | Neiser |
| 2014/0257553 | A1 | 9/2014 | Shakes et al. |
| 2014/0279294 | A1 | 9/2014 | Field-Darragh et al. |
| 2014/0350717 | A1 | 11/2014 | Dagle et al. |
| 2015/0032252 | A1 | 1/2015 | Galluzzo et al. |
| 2015/0067080 | A1 | 3/2015 | Cho et al. |
| 2015/0073589 | A1 * | 3/2015 | Khodl ..................... B25J 5/007 |
| | | | 700/218 |
| 2015/0332213 | A1 * | 11/2015 | Galluzzo .................. B25J 5/007 |
| | | | 700/216 |
| 2015/0356648 | A1 | 12/2015 | Baryakar et al. |
| 2015/0360865 | A1 | 12/2015 | Massey |
| 2016/0082589 | A1 | 3/2016 | Skrinde |
| 2016/0221187 | A1 | 8/2016 | Bradski et al. |
| 2016/0236867 | A1 | 8/2016 | Brazeau et al. |
| 2016/0260049 | A1 | 9/2016 | High et al. |
| 2016/0304280 | A1 | 10/2016 | Elazary et al. |
| 2016/0314514 | A1 | 10/2016 | High et al. |
| 2016/0379166 | A1 | 12/2016 | Singel et al. |
| 2017/0169672 | A1 * | 6/2017 | Farrow .............. G06K 7/10366 |
| 2018/0158016 | A1 * | 6/2018 | Pandya ................ G06Q 10/087 |

OTHER PUBLICATIONS

Kumar, Swagat et al., Robotics-as-a-Service: Transforming the Future of Retail, http://www.tcs.com/resources/white_papers/Pages/RoboticsasService.aspx, last viewed Sep. 9, 2016.

New robotic grocery store coming to Des Moine, YouTube, https://www.youtube.com/watch?v=LC-1PCu69M4, last viewed Jan. 24, 2018.

Gross, Zoé, Robotic dispensing device installed at St. Thomas hostpital, The Pharmaceutical Journal, vol. 26, No. 7120, p. 6530655, Oct. 28, 2000.

Robotic Shelf Picking—IAM Robotics Automated Storage & Retrieval System (AS/RS), YouTube, https://www.youtube.com/watch?v=h9eRDyZJzSA, last viewed Jan. 24, 2018.

Gross, Zoë, Robotic dispensing device installed at St. Thomas hospital, The Pharmaceutical Journal, vol. 26, No. 7120, p. 6530655, Oct. 28, 2000.

Written Opinion and International Search Report from related International Patent Application No. PCT/US2018/015514 dated Apr. 12, 2018.

Written Opinion and International Search Report from related International Patent Application No. PCT/US2018/015444 dated Mar. 22, 2018.

Written Opinion and International Search Report from related International Patent Application No. PCT/US2018/015386 dated Mar. 13, 2018.

Written Opinion and International Search Report from related International Patent Application No. PCT/US2018/015390 dated Apr. 6, 2018.

Written Opinion and International Search Report from related International Patent Application No. PCT/US2018/015475 dated Mar. 22, 2018.

* cited by examiner

DISTRIBUTED AUTONOMOUS ROBOT SYSTEMS AND METHODS

CROSS-REFERENCE TO RELATED PATENT APPLICATIONS

This application claims priority to U.S. Provisional Application No. 62/452,112 filed on Jan. 30, 2017, the content of which is hereby incorporated by reference in its entirety.

BACKGROUND

Autonomous robot systems can perform various tasks without human intervention. However, oversight of such autonomous robot systems may be necessary to ensure the autonomous robot systems are functioning properly.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein is an automated fulfillment system including a computing system programmed to receive requests from disparate sources for physical objects disposed at one or more locations in a facility. The computing system can combine the requests, and group the physical objects in the requests based on object types or expected object locations. The system further includes autonomous robot devices in selective communication with the computing system via a communications network. The autonomous robot devices include a controller, a drive motor, an articulated arm, a reader and an image capturing device.

The autonomous robot devices can be configured to receive instructions from the computing system to retrieve a group of the physical objects, determine a set of object locations of the physical objects in the group, autonomously retrieve each of the physical objects in the group from the set of object locations and deposit the physical objects in the group in storage containers. Each of the storage containers can correspond to one of the requests and the autonomous robot device can deposit the physical objects in the storage containers based on the requests to which the physical objects and the containers are associated. The system further includes sensors disposed at the set of object locations and/or in the storage containers. The sensors are configured to determine that the autonomous robot devices retrieved the physical objects in the group and/or deposited the physical objects in the appropriate containers.

The system can include a database operatively coupled to the computing system and instructions from the computing system can include identifiers for the physical objects in the group of physical objects. The autonomous robot devices can be configured to query the database using the identifiers for the physical objects in the group to retrieve the set of object locations at which the physical objects in group are disposed; navigate autonomously through the facility to the set of object locations in response to operation of the drive motor by the controller; locate and scan one or more machine readable elements encoded with the one or more identifiers; detect, via an image captured by the image capture device, that the group of physical objects are disposed at the set of locations; pick up a quantity of physical objects in the group using the articulated arm, carry and navigate with the quantity of physical objects in the group to the storage containers located at a different location in the facility; deposit a subset of the quantity of physical objects in the group in a storage containers; and deposit a different subset of the quantity of physical objects in the group different one of the storage containers. The autonomous robot device can be configured to transport the storage containers to a specified location in the facility.

In some embodiments, shelving units can be disposed in the facility and the physical objects can be disposed on at the shelving units. The sensors can be disposed in or about the shelving units. The sensors can be configured to detect a change in a set of attributes associated with the physical objects on the shelving units when the quantity of physical objects in the group are removed from the shelving units, and transmit the set of attributes to the computing system. The computing system can update the database in response to receiving the set of attributes.

In some embodiments, the sensors disposed in the storage containers can be configured to detect a set of attributes associated with physical objects deposited in the storage container. The sensors can transmit the set of attributes to the computing system and the computing system can be programmed to update the database in response to receiving the sets of attributes.

Figure 1A:
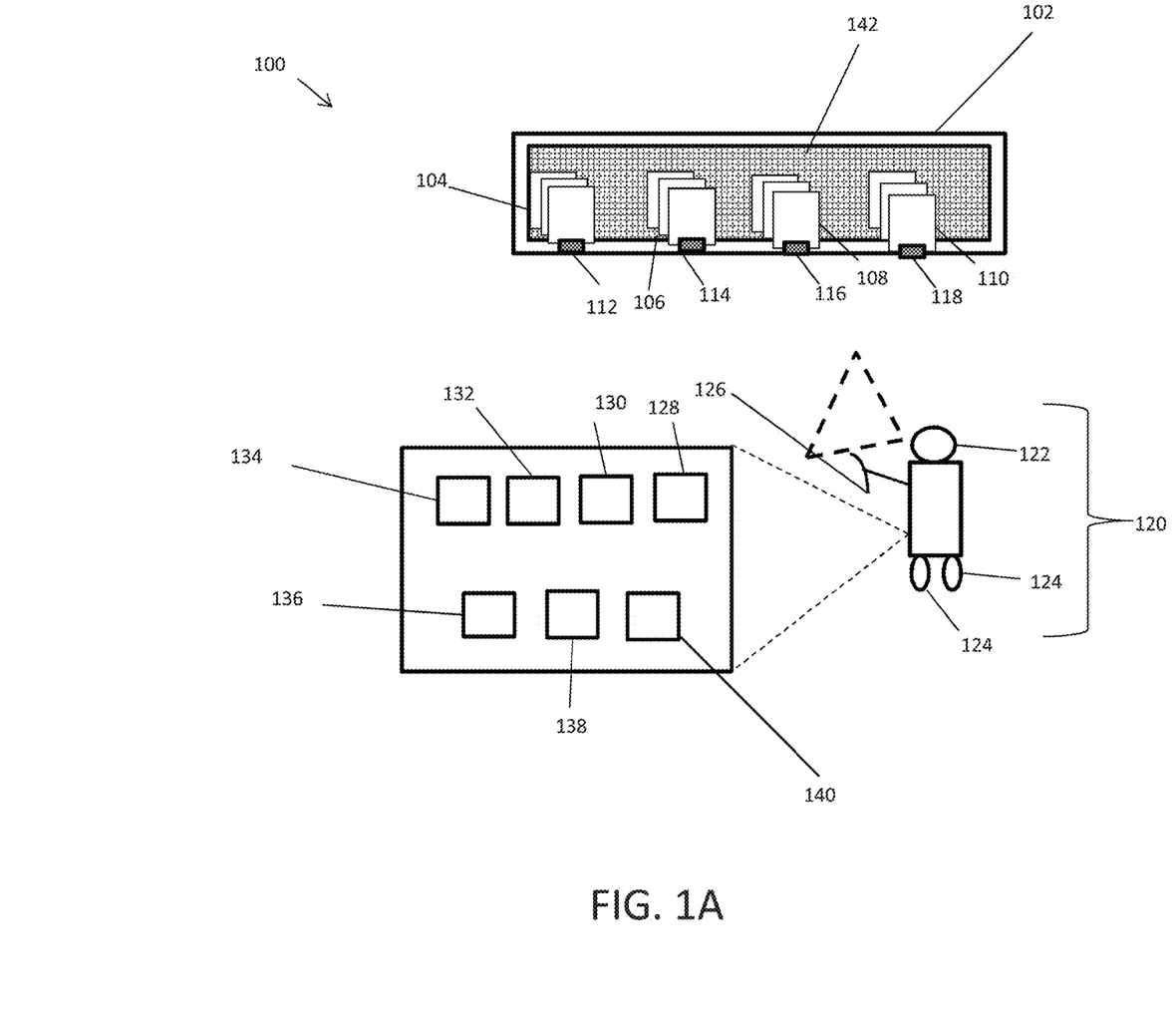
FIG. 1A is a block diagram illustrating an autonomous robot device operating in a facility according to exemplary embodiments of the present disclosure.

FIG. 1A is a block diagram illustrating an autonomous robot device in an autonomous robot fulfillment system according to exemplary embodiments of the present disclosure. In exemplary embodiments, sets of physical objects 104-110 can be disposed in a facility 100 on a shelving unit 102, where each set of like physical objects 104-110 can be grouped together on the shelving unit 102. The physical objects in each of the sets can be associated with identifiers encoded in a machine-readable element 112-118 corresponding to the physical objects in the sets 104-110 accordingly, where like physical object can be associated with identical identifiers and disparate physical objects can be associated with different identifiers. The machine readable elements 112-118 can be bar codes or QR codes.

The autonomous robot device 120 can be a driverless vehicle, an unmanned aerial craft, automated conveying belt or system of conveyor belts, and/or the like. Embodiments of the autonomous robot device 120 can include an image capturing device 122, motive assemblies 124, a picking unit 126, a controller 128, an optical scanner 130, a drive motor 132, a GPS receiver 134, accelerometer 136 and a gyroscope 138, and can be configured to roam autonomously through the facility 100. The picking unit 126 can be an articulated arm. The autonomous robot device 120 can be an intelligent device capable of performing tasks without human control. The controller 128 can be programmed to control an operation of the image capturing device 122, the optical scanner 130, the drive motor 132, the motive assemblies 124 (e.g., via the drive motor 132), in response to various inputs including inputs from the GPS receiver 134, the accelerometer 136, and the gyroscope 138. The drive motor 132 can control the operation of the motive assemblies 124 directly and/or through one or more drive trains (e.g., gear assemblies and/or belts). In this non-limiting example, the motive assemblies 124 are wheels affixed to the bottom end of the autonomous robot device 120. The motive assemblies 124 can be but are not limited to wheels, tracks, rotors, rotors with blades, and propellers. The motive assemblies 124 can facilitate 360 degree movement for the autonomous robot device 120. The image capturing device 122 can be a still image camera or a moving image camera.

The GPS receiver 134 can be a L-band radio processor capable of solving the navigation equations in order to determine a position of the autonomous robot device 120, determine a velocity and precise time (PVT) by processing the signal broadcasted by GPS satellites. The accelerometer 136 and gyroscope 138 can determine the direction, orientation, position, acceleration, velocity, tilt, pitch, yaw, and roll of the autonomous robot device 120. In exemplary embodiments, the controller can implement one or more algorithms, such as a Kalman filter, for determining a position of the autonomous robot device.

Sensors 142 can be disposed on the shelving unit 102. The sensors 142 can include temperature sensors, pressure sensors, flow sensors, level sensors, proximity sensors, biosensors, image sensors, gas and chemical sensors, moisture sensors, humidity sensors, mass sensors, force sensors and velocity sensors. At least one of the sensors 142 can be made of piezoelectric material as described herein. The sensors 142 can be configured to detect a set of attributes associated with the physical objects in the sets of like physical objects 104-110 disposed on the shelving unit 102. The set of attributes can be one or more of: quantity, weight, temperature, size, shape, color, object type, and moisture attributes.

The autonomous robot device 120 can receive instructions to retrieve physical objects from the sets of like physical objects 104-110 from the facility 100. For example, the autonomous robot device 120 can receive instructions to retrieve a predetermined quantity of physical objects from the sets of like physical objects 104 and 106. The instructions can include identifiers associated with the sets of like physical objects 104 and 106. The autonomous robot device 120 can query a database to retrieve the designated location of the set of like physical objects 104 and 106. The autonomous robot device 120 can navigate through the facility 100 using the motive assemblies 124 to the set of like physical objects 104 and 106. The autonomous robot device 120 can be programmed with a map of the facility 100 and/or can generate a map of the first facility 100 using simultaneous localization and mapping (SLAM). The autonomous robot device 120 can navigate around the facility 100 based on inputs from the GPS receiver 228, the accelerometer 230, and/or the gyroscope 232.

Subsequent to reaching the designated location(s) of the set of like physical objects 104 and 106, the autonomous robot device 120 can use the optical scanner 130 to scan the machine readable elements 112 and 114 associated with the set of like physical objects 104 and 106 respectively. In some embodiments, the autonomous robot device 120 can capture an image of the machine-readable elements 112 and 114 using the image capturing device 122. The autonomous robot device can extract the machine readable element from the captured image using video analytics and/or machine vision.

The autonomous robot device 120 can extract the identifier encoded in each machine readable element 112 and 114. The identifier encoded in the machine readable element 112 can be associated with the set of like physical objects 104 and the identifier encoded in the machine readable element 114 can be associated with the set of like physical objects 106. The autonomous robot device 120 can compare and confirm the identifiers received in the instructions are the same as the identifiers decoded from the machine readable elements 112 and 114. The autonomous robot device 120 can capture images of the sets of like physical objects 104 and 106 and can use machine vision and/or video analytics to confirm the set of like physical objects 104 and 106 are present on the shelving unit 102. The autonomous robot device 120 can also confirm the set of like physical objects 104 and 106 include the physical objects associated with the identifiers by comparing attributes extracted from the images of the set of like physical objects 104 and 106 in the shelving unit and stored attributes associated with the physical objects 104 and 106.

The autonomous robot device 120 can pick up a specified quantity of physical objects from each of the sets of like physical objects 104 and 106 from the shelving unit 102 using the picking unit 126. The autonomous robot device 120 can carry the physical objects it has picked up to a different location in the facility 100 and/or can deposit the physical objects on an autonomous conveyor belt for transport to a different location in the store.

The sensors 142 can detect when a change in a set of attributes regarding the shelving unit 102 in response to the autonomous robot device 120 picking up the set of like physical objects 104 and 106. For example, the sensors can detect a change in quantity, weight, temperature, size, shape, color, object type, and moisture attributes. The sensors 142 can detect the change in the set of attributes in response to the change in the set of attributes being greater than a predetermined threshold. The sensors 142 can encode the change in the set of attributes into electrical signals. The sensors can transmit the electrical signals to a computing system.

Figure 1B:
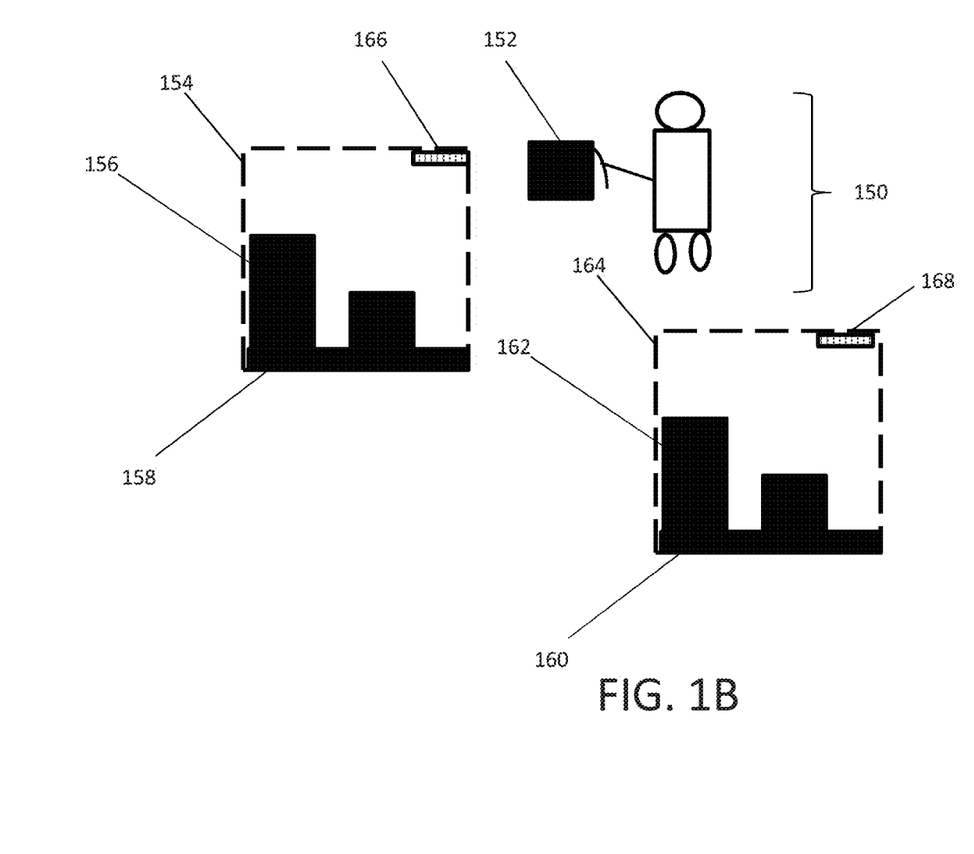
FIG. 1B is a block diagrams illustrating another autonomous robot device in an autonomous system according to exemplary embodiments of the present disclosure.

FIG. 1B is a block diagrams illustrating another autonomous robot device 150 in a facility according to exemplary embodiments of the present disclosure. As mentioned above, the autonomous robot device 150 can transport the physical objects 152 to a different location in the facility and/or can deposit the physical objects on an autonomous conveyor belt or system of conveyor belts to transport the physical objects 152 to a different location. The different location can include storage containers 154 and 164. Machine-readable elements 166 and 168 can be disposed on the storage containers 154 and 164 respectively. The machine-readable elements 166 and 168 can be encoded with identifiers associated with the storage containers 154 and 164. The storage container 154 can store physical objects 156 and the storage container 164 can store physical objects 162. The storage containers 154 and 164 can also include sensors 158 and 160, respectively, disposed in the storage containers 154 and 156 (e.g., at a base of the storage containers 154 and 156. The sensors can include The sensors 142 can include temperature sensors, pressure sensors, flow sensors, level sensors, proximity sensors, biosensors, image sensors, gas and chemical sensors, moisture sensors, humidity sensors, mass sensors, force sensors and velocity sensors. The physical objects 156 and 162 can be placed in proximity to and/or on top of the sensors 158 and 160. In some embodiments, a least one of the sensors 158 and 160 can be made of piezoelectric material as described herein. The sensors 158 and 160 can be configured to detect a set of attributes associated with the physical objects 156 and 162 disposed in the storage containers 154 and 164, respectively. The set of attributes can be one or more of: quantity, weight, temperature, size, shape, color, object type, and moisture attributes. The sensors can transmit the detected set of attributes to a computing system.

As mentioned above, the autonomous robot device 150 can receive instructions to retrieve physical objects 152. The instructions can also include an identifier of the storage container in which the autonomous robot device 150 should place the physical objects 152. The autonomous robot device 150 can navigate to the storage containers 154 and 164 with the physical objects 152 and scan the machine readable element 166 and 168 for the storage containers 154 and 164. The autonomous robot device 150 extract the identifiers from the machine readable elements 166 and 168 and determine in which storage container to place the physical objects 152. For example, the instructions can include an identifier associated with the storage container 154. The autonomous robot device 150 can determine from the extracted identifiers to place the physical objects 152 in the storage container 154. In another embodiment, the storage containers 154 and 164 can be scheduled for delivery. The instructions can include an address(es) to which the storage containers are being delivered. The autonomous robot device 150 can query a database to determine the delivery addresses of the storage containers 154 and 164. The autonomous robot device 150 can place the physical objects 152 in the storage container with a delivery address corresponding to the address included in the instructions. Alternatively, the instructions can include other attributes associated with the storage containers 154 and 164 by which the autonomous robot device 150 can determine the storage container 154 or 164 in which to place the physical objects 152. The autonomous robot device 150 can also be instructed to place a first quantity of physical objects 152 in the storage container 154 and a second quantity of physical objects 152 in storage container 164.

Figure 1C:
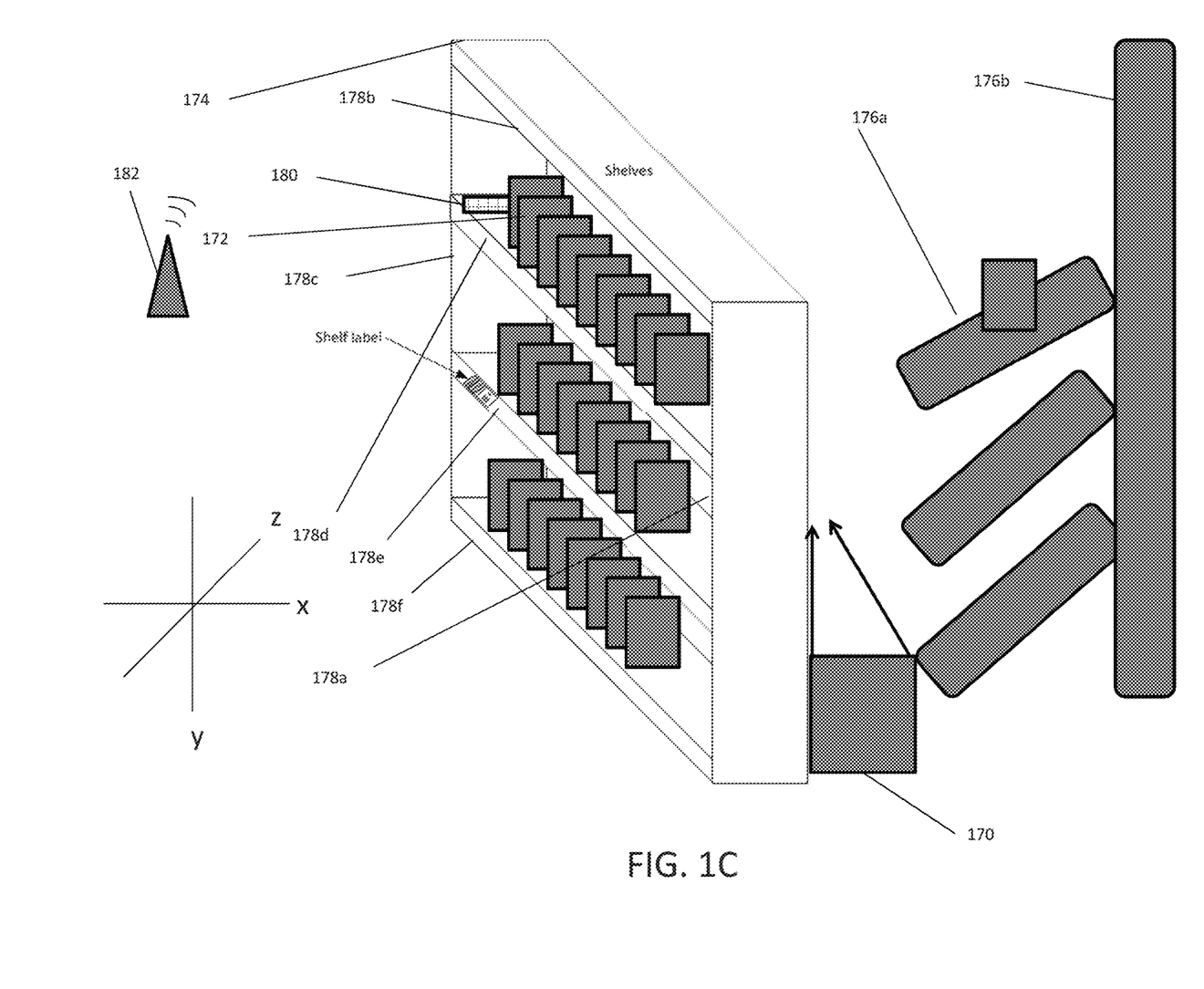
FIG. 1C illustrates a smart shelf system in accordance with an exemplary embodiment.

FIG. 1C illustrates an smart shelf system according to exemplary embodiments of the present disclosure. In some embodiments, the robotic device can be a smart shelf autonomous storage and retrieval system including an autonomous retrieval container 170 affixed to a shelving unit 174, and one or more conveyer belts 176a-b disposed behind the shelving unit 174. The conveyer belts 176a can be disposed with respect to different sections of the shelving unit 174. The conveyer belt 176b can be disposed adjacent to the conveyer belt 176a. Physical objects 172 can be disposed on the shelving unit 174. The retrieval container 170 can receive instructions to retrieve one or more physical objects from the shelving unit 174. The instructions can include the locations of the physical objects on the shelving unit 174. The autonomous retrieval container 170 can autonomously navigate along the edges 178a-f of the shelving unit 174 (which can include tracks or guides) and retrieve the instructed physical objects 172 based on the locations in the instructions. The autonomous retrieval container 170 can navigate along the x and y axis. The autonomous retrieval container 170 can include a volume in which to store the retrieved physical objects.

Sensors 180 can be disposed on or about the shelving unit 174. The sensors 180 can detect when a change in a set of attributes regarding the shelving unit 174 in response to the autonomous retrieval container 170 retrieving the instructed physical objects. For example, the sensors 180 can detect a change in quantity, weight, temperature, size, shape, color, object type, and moisture attributes. The sensors 180 can detect the change in the set of attributes in response to the change in the set of attributes being greater than a predetermined threshold. The sensors 180 can encode the change in the set of attributes into electrical signals. The sensors can transmit the electrical signals to a computing system.

As described herein, RFID tags can be disposed on or about the physical objects disposed on the shelving unit 174. The RFID reader 182 can detect the RFID tags disposed on or about the physical objects 172 picked up by the autonomous retrieval container in response to the RFID tags being in range of the of the RFID reader 144. The RFID reader 144 can extract the unique identifiers encoded in the RFID tags and can transmit the unique identifiers of the RFID tags to the computing system.

The autonomous retrieval container 170 can receive instructions to retrieve physical objects 172 from the shelving unit 174. The instructions can include the locations of the physical objects 172 on the shelving unit 174. The autonomous retrieval container can traverse along the edges 178a-f of the shelving unit and retrieve the physical objects. The autonomous retrieval container 170 can place the physical objects on the conveyer belt 172a disposed behind the shelving unit 174. The conveyer belts 176a can receive instructions to transport physical objects to the conveyer belt 176b disposed adjacent to the conveyer belt 176a. The conveyer belt 176b can receive instructions to transport the physical objects to a specified location in a facility such as a delivery vehicle or a loading area.

Figure 1D:
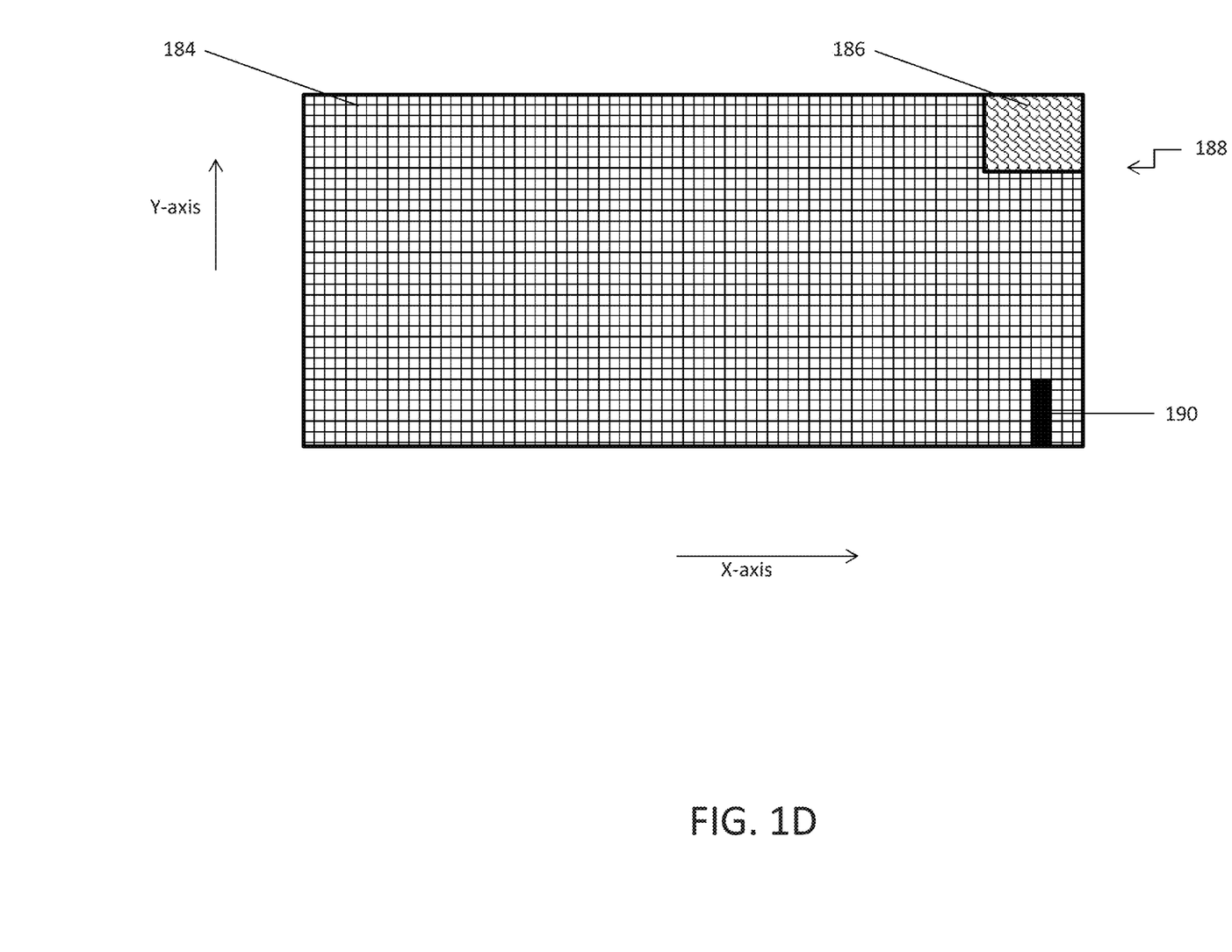
FIG. 1D illustrates an array of sensors in accordance with an exemplary embodiment.

FIG. 1D illustrates an array of sensors 188 in accordance with an exemplary embodiment. The array of sensors 188 can be disposed at the shelving units (e.g., embodiments of the shelving unit 102 and 174 shown in FIGS. 1A and 1C) and/or base of the storage containers (e.g., embodiments of the containers 154 and 164 shown in FIG. 1B). The array of sensors 188 may be arranged as multiple individual sensor strips 186 extending along the shelving units and/or base of the storage containers, defining a sensing grid or matrix. The array of sensors 188 can be built into the shelving units and/or base of the storage containers itself or may be incorporated into a liner or mat disposed at the shelving units and/or base of the storage containers. Although the array of sensors 188 is shown as arranged to form a grid, the array of sensors can be disposed in other various ways. For example, the array of sensors 188 may also be in the form of lengthy rectangular sensor strips extending along either the x-axis or y-axis. The array of sensors 188 can detect attributes associated with the physical objects that are stored on the shelving units and/or the storage containers, such as, for example, detecting pressure or weight indicating the presence or absence of physical objects at each individual sensor 184. In some embodiments, the surface of the shelving unit is covered with an appropriate array of sensors 188 with sufficient discrimination and resolution so that, in combination, the sensors 184 are able to identify the quantity, and in some cases, the type of physical objects in the storage container or shelving units.

In some embodiments the array of sensors 188 can be disposed along a bottom surface of a storage container and can be configured to detect and sense various characteristics associated with the physical objects stored within the storage container. The array of sensors can be built into the bottom surface of the tote or can be incorporated into a liner or mat disposed at the bottom surface of the mat.

The array of sensors 188 may be formed of a piezoelectric material, which can measure various characteristics, including, for example, pressure, force, and temperature. While piezoelectric sensors are one suitable sensor type for implementing at least some of the sensor at the shelving units and/or in the containers, exemplary embodiments can implement other sensor types for determine attributes of physical objects including, for example, other types of pressure/weight sensors (load cells, strain gauges, etc.).

The array of sensors 188 can be coupled to a radio frequency identification (RFID) device 190 with a memory having a predetermined number of bits equaling the number of sensors in the array of sensors 188 where each bit corresponds to a sensor 184 in the array of sensors 178. For example, the array of sensors 176 may be a 16×16 grid that defines a total of 256 individual sensors 184 may be coupled to a 256 bit RFID device such that each individual sensor 184 corresponds to an individual bit. The RFID device including a 256 bit memory may be configured to store the location information of the shelving unit and/or tote in the facility and location information of merchandise physical objects on the shelving unit and/or tote. Based on detected changes in pressure, weight, and/or temperature, the sensor 184 may configure the corresponding bit of the memory located in the RFID device (as a logic "1" or a logic "0"). The RFID device may then transmit the location of the shelving unit and/or tote and data corresponding to changes in the memory to the computing system.

Figure 2:
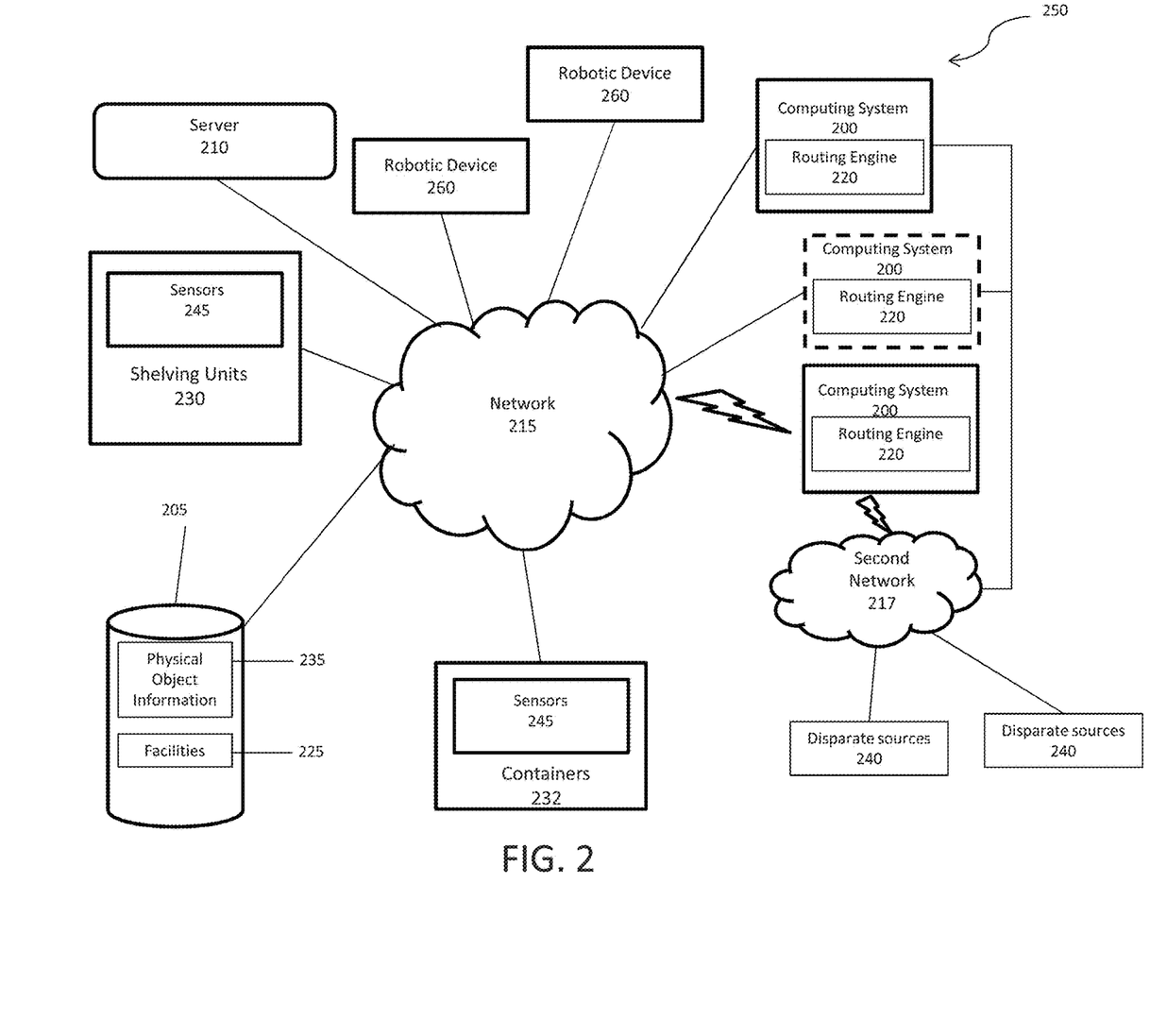
FIG. 2 is a block diagrams illustrating an automated robot fulfillment system according to exemplary embodiments of the present disclosure.

FIG. 2 illustrates an exemplary automated robotic fulfillment system 250 in accordance with an exemplary embodiment. The automated robotic fulfillment system 250 can include one or more databases 205, one or more servers 210, one or more computing systems 200, sensors 245, robotic devices 260 and disparate sources 240. The sensors 245 can be sensors disposed at a shelving unit 230 from which the sensors can detect attributes of the physical objects on the shelving units (e.g., as embodied by sensors 142 shown in FIG. 1A). Alternatively, or in addition, the sensors 245 can be sensors disposed at a bottom surface of a storage container 232 from which the sensors can detect attributes of the physical objects in the storage containers 232 (e.g., as embodied by sensors 158 and 160 shown in FIG. 1B). In some embodiments, the sensors 245 can be an array of sensors (e.g., as embodied by the array of sensors 176 shown in FIG. 1C). In exemplary embodiments, the computing system 200 can be in communication with the databases 205, the server(s) 210, the sensors 245, the robotic devices 260, via a first communications network 215. The computing system 200 can be in communication with disparate sources 240 via a second communications network 217.

In an example embodiment, one or more portions of the first and second communications network 215 and 217 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 200 and the databases 205, via the first network 215. The server 210 hosts one or more applications configured to interact with one or more components computing system 200 and/or facilitates access to the content of the databases 205. In some embodiments, the server 210 can host a routing engine 220 or portions thereof. The databases 205 may store information/data, as described herein. For example, the databases 205 can include physical objects database 235 and a facilities database 225. The physical objects database 235 can store information associated with physical objects disposed at a facility and can be indexed via the decoded identifier retrieved by the identifier reader. The facilities database 225 can include information about the facility in which the physical objects are disposed. The databases 205 and server 210 can be located at one or more geographically distributed locations from each other or from the computing system 200. Alternatively, the databases 205 can be included within server 210. The disparate sources 240 can be various computing devices located at one or more geographically distributed locations from the computing system 200.

In exemplary embodiments, the computing system 200 can receive a request from one or more disparate sources 240 to retrieve physical objects disposed in one or more facilities. The computing system 200 can execute the routing engine 220 in response to receiving the request to retrieve the physical objects. The routing engine 220 can query the facilities database 225 to retrieve the locations of the requested physical objects within the one or more facilities. The routing engine 220 can divide the requested physical objects into groups based one or more attributes associated with the requested physical objects. For example, the routing engine 220 can group the requested physical objects based on the proximity between the locations of the physical objects on the shelving units 230 and/or can create groups of physical objects with shortest paths between the locations of the physical objects. In another example, the routing engine 220 can divide the physical objects into groups based on the size of the physical objects or type of physical object. Each group can include requested physical objects from various requests from various disparate sources 240.

The routing engine 220 can assign one or more groups of requested physical object to different robotic device 260 disposed in the facility. The robotic devices 260 can receive instructions from the routing engine 220 to retrieve the one or more groups of physical objects and transport the physical objects to a location of the facility including various storage containers. The one or more groups of physical objects can include a predetermined quantity of physical objects from different sets of like physical objects. The instructions can include identifiers associated with the physical objects and identifiers associated with the storage containers. The instructions can include identifiers for various storage containers. The retrieved physical objects can be deposited in different storage containers based on attributes associated with the physical objects. The attributes can include: a delivery address of the physical objects, size of the physical objects and the type of physical objects. The robotic devices 260 can query the facilities database 225 to retrieve the locations of the physical objects in the assigned group of physical objects. The robotic device 260 can navigate to the physical objects and scan a machine-readable element encoded with an identifier associated with each set of like physical objects. The robotic device 260 can decode the identifier from the machine-readable element and query the physical objects database 235 to confirm the robotic device 260 was at the correct location. The robotic device 260 can also retrieve stored attributes associated with the set of like physical objects in the physical objects database 235. The robotic device 260 can capture an image of the set of like physical objects and extract a set of attributes using machine vision and/or video analytics. The robotic device 260 can compare the extracted set of attributes with the stored set of attributes to confirm the set of like physical objects are same as the ones included in the instructions. The extracted and stored attributes can include, image of the physical objects, size of the physical objects, color of the physical object or dimensions of the physical objects. The types of machine vision and/or video analytics used by the routing module 230 can be but are not limited to: Stitching/Registration, Filtering, Thresholding, Pixel counting, Segmentation, Inpainting, Edge detection, Color Analysis, Blob discovery & manipulation, Neural net processing, Pattern recognition, Barcode Data Matrix and "2D barcode" reading, Optical character recognition and Gauging/Metrology.

The robotic devices 260 can pick up a specified quantity of physical objects in the one or more group of physical objects and carry the physical objects to a location of the facility including storage containers. The storage containers can have machine-readable elements disposed on the frame of the storage containers. The robotic devices 260 can scan the machine-readable elements of the storage containers and decode the identifiers from the machine-readable elements. The robotic devices 260 can compare the decoded identifiers with the identifiers associated with the various storage containers included in the instructions. The robotic devices 260 can deposit the physical objects from the one or more groups assigned to the robotic device 260 in the respective storage containers. For example, the robotic device 260 can deposit a first subset of physical objects from the one or more groups of physical objects in a first storage container 232 and a second subset of physical objects from one or more groups of physical objects in a second storage container 232 based on the instructions.

In the event the autonomous robotic device 260 is embodied as a smart shelf autonomous storage and retrieval system. The autonomous robot device 260 can traverse along the edges of the shelving unit 230 and retrieve the products. The autonomous robotic device 260 can place the products on a conveyer belt disposed behind the shelving unit 230. The conveyer belts can receive instructions from the routing engine 220 to transport products to a master conveyer belt. The maser conveyer belt can receive instructions to transport the products to a specified location in a facility such as a delivery vehicle or a loading area.

As mentioned above, sensors 245 can be disposed at the shelving unit 230 in which the requested physical objects are disposed. The sensors 245 disposed at the shelving unit 230 can transmit a first of attributes associated with the physical objects disposed on the shelving unit 230, encoded into electrical signals to the routing engine 220 in response to the robotic device 260 picking up the physical objects from the shelving unit. The sensors 245 can be coupled to an RFID device. The RFID device can communicate the electrical signals to the routing engine 220. The first set of attributes can be a change in weight, temperature and moisture on the shelving unit 230. The routing engine 220 can decode the first set of attributes from the electrical signals. The routing engine 220 can determine the correct physical objects were picked up from the shelving unit 230 based on the first set of attributes. For example, the physical objects can be perishable items. The robotic device 260 can pick up the perishable items and based on the removal of perishable items, the sensors 245 disposed at the shelving unit 230, can detect a change in the moisture level. The sensors 245 can encode the change in moisture level in an electrical signals and transmit the electrical signals to the routing engine 220. The routing engine 220 can decode the electrical signals and determine the perishable items picked up by the robotic device 260 are damaged or decomposing based on the detected change in moisture level. The routing engine 220 can send new instructions to the robotic device to pick up new perishable items and discard of the picked up perishable items.

The sensors 245 can also be disposed at the base of the storage containers 232. The sensors 245 disposed at the base of the storage containers 232 can transmit a second set of attributes associated with the physical objects disposed in the storage containers 232 to the routing engine 220. The sensors 245 can be coupled to an RFID device. The RFID device can communicate the electrical signals to the routing engine 220. The first set of attributes can be a change in weight, temperature and moisture in the storage containers 232. The routing engine 220 can decode the first set of attributes from the electrical signals. The routing engine 220 can determine whether the correct physical objects were deposited in the storage containers 232 based on the second set of attributes. For example, the sensors 245 disposed at the base of the storage containers 232 can detect an increase in weight in response to the robotic device 260 depositing an item in the storage container. The sensors 245 can encode the increase in weight in electrical signals and transmit the electrical signals to the routing engine 220. The routing engine 220 can decode the electrical signals and determine the an incorrect physical object was placed in the storage container 232 based on the increase in weight. The routing engine 220 can transmit instructions to the robotic device 260 to remove the deposited physical object from the storage container 232. The routing engine 220 can also include instructions to deposit the physical object in a different storage container.

As a non-limiting example, the automated robotic fulfillment system 250 can be implemented in a retail store and products can be disposed at the retail store. The computing system 200 can receive instructions to retrieve products from a retail store based on a completed transaction at a physical or retail store. The computing system 200 can receive instructions from multiple different sources. For example, the computing system 200 can receive instructions to retrieve products for various customers. The computing system 200 can receive the instructions to from disparate sources 240 such as an mobile device executing an instance of the retail store's mobile application or a computing device accessing the online store. The computing system 200 can execute the routing engine 220 in response to receiving the instructions. The routing engine can query the facilities database 225 to retrieve the location of the products in the retail store and a set of attributes associated with the requested products. The robotic devices 260 can use location/position technologies including LED lighting, RF beacons, optical tags, waypoints to navigate around the facility The routing engine 220 can divide the requested products into groups based on the locations of the products within the retail store and/or the set of attributes associated with the products. For example, the routing engine 220 can divide the products into groups based on a location of the products, the priority of the products, the size of the products or the type of the products.

The routing engine 220 can instruct the robotic devices 260 to retrieve one or more groups of products in the retails store and transport the products to a location of the facility including various storage containers 232. The one or more groups of physical objects can include a predetermined quantity of physical objects from different sets of like physical objects. The instructions can include identifiers associated with the products and identifiers associated with the storage containers 232. The instructions can include identifiers for various storage containers 232. The retrieved products can be deposited in different storage containers 232 based on attributes associated with the products. The attributes can include: a delivery address of the products, priority assigned to the products, size of the products and the type of products. The robotic devices 260 can query the facilities database 225 to retrieve the locations of the products in the assigned group of products. The robotic device 260 can navigate to the products and scan a machine-readable element encoded with an identifier associated with each set of like products. The robotic device 260 can decode the identifier from the machine-readable element and query the physical objects database 235 to confirm the robotic device 260 was at the correct location. The robotic device 260 can also retrieve stored attributes associated with the set of like products in the physical objects database 235. The robotic device 260 can capture an image of the set of like physical objects and extract a set of attributes using machine vision and/or video analytics. The robotic device 260 can compare the extracted set of attributes with the stored set of attributes to confirm the set of like products are same as the ones included in the instructions.

The robotic devices 260 can pick up the products in the group of physical objects and transport the products to a location of the facility including storage containers 232. The storage containers 232 can have machine-readable elements disposed on the frame of the storage containers 232. The robotic devices 260 can scan the machine-readable elements of the storage containers 232 and decode the identifiers from the machine-readable elements. The robotic devices 260 can compare the decoded identifiers with the identifiers associated with the various storage containers 232 included in the instructions. The robotic devices 260 can deposit the products from the group of products assigned to the robotic device 260 in the respective storage containers 232. For example, the robotic device 260 can deposit a first subset of products from the group of physical objects in a first storage container 232 and a second subset of products from the group of physical objects in a second storage container 232 based on the instructions. In some embodiments, the robotic device 260 can determine the storage container 232 is full or the required amount of products are in the storage container 232. The robotic device 260 can pick up the storage container 232 and transport the storage container 232 to a different location in the facility. The different location can be a loading dock for a delivery vehicle or a location where a customer is located. In one example, the robotic device 260 can transfer items between them. e.g. multi-modal transport within the facility. For example, the robotic device 260 can dispense an item onto a conveyor which transfers to staging area where an aerial unit picks up for delivery. In another embodiment the robotic device 260 can be an automated shelf dispensing unit. The shelf dispensing unit can dispense the items into the storage containers. A robotic device 260 can pick up the storage containers and transport the storage containers to a location in the facility.

Sensors 245 can be disposed at the shelving unit 230 in which the requested products are disposed. The sensors 245 disposed at the shelving unit 230 can transmit a first of attributes associated with the products encoded in electrical signals to the routing engine 220 in response to the robotic device picking up the products from the shelving unit 230. The first set of attributes can be a change in weight, temperature and moisture on the shelving unit 230. The routing engine 220 can decode the first set of attributes from the electrical signals. The routing engine 220 can determine the correct products were picked up from the shelving unit 230 based on the first set of attributes. For example, the products can be perishable items. The robotic device 260 can pick up the perishable items and based on the removal of perishable items, the sensors 245 disposed at the shelving unit 230, can detect a change in the moisture level. The sensors 245 can encode the change in moisture level in an electrical signals and transmit the electrical signals to the routing engine 220. The change in moisture can indicate a damaged, decomposing or unfresh perishable items (i.e. brown bananas). The routing engine 220 can decode the electrical signals and determine the perishable items picked up by the robotic device 260 are damaged or decomposing based on the detected change in moisture level. The routing engine 220 can send new instructions to the robotic device to pick up new perishable items and discard of the picked up perishable items. For example, the routing engine 220 can launch a web application for a user such as the customer and/or associate at the retail store to monitor which perishable items are picked up.

The sensors 245 can also be disposed at the base of the storage containers 232. The sensors 245 disposed at the base of the storage containers 232 can transmit a second set of attributes associated with the products disposed in the storage containers 232 to the routing engine 220. The first set of attributes can be a change in weight, temperature and moisture in the storage containers 232. The routing engine 220 can decode the first set of attributes from the electrical signals. The routing engine 220 can determine whether the correct products were deposited in the storage containers 232 based on the second set of attributes. For example, the sensors 245 disposed at the base of the storage containers 232 can detect an increase in weight in response to the robotic device 260 depositing a product in the storage container 232. The sensors 245 can encode the increase in weight in electrical signals and transmit the electrical signals to the routing engine 220. The routing engine 220 can decode the electrical signals and determine the an incorrect product was placed in the storage container 232 based on the increase in weight. The routing engine 220 can transmit instructions to the robotic device 260 to remove the deposited product from the storage container 232. The routing engine 220 can also include instructions to deposit the product in a different storage container 232 or discard of the product.

Figure 3:
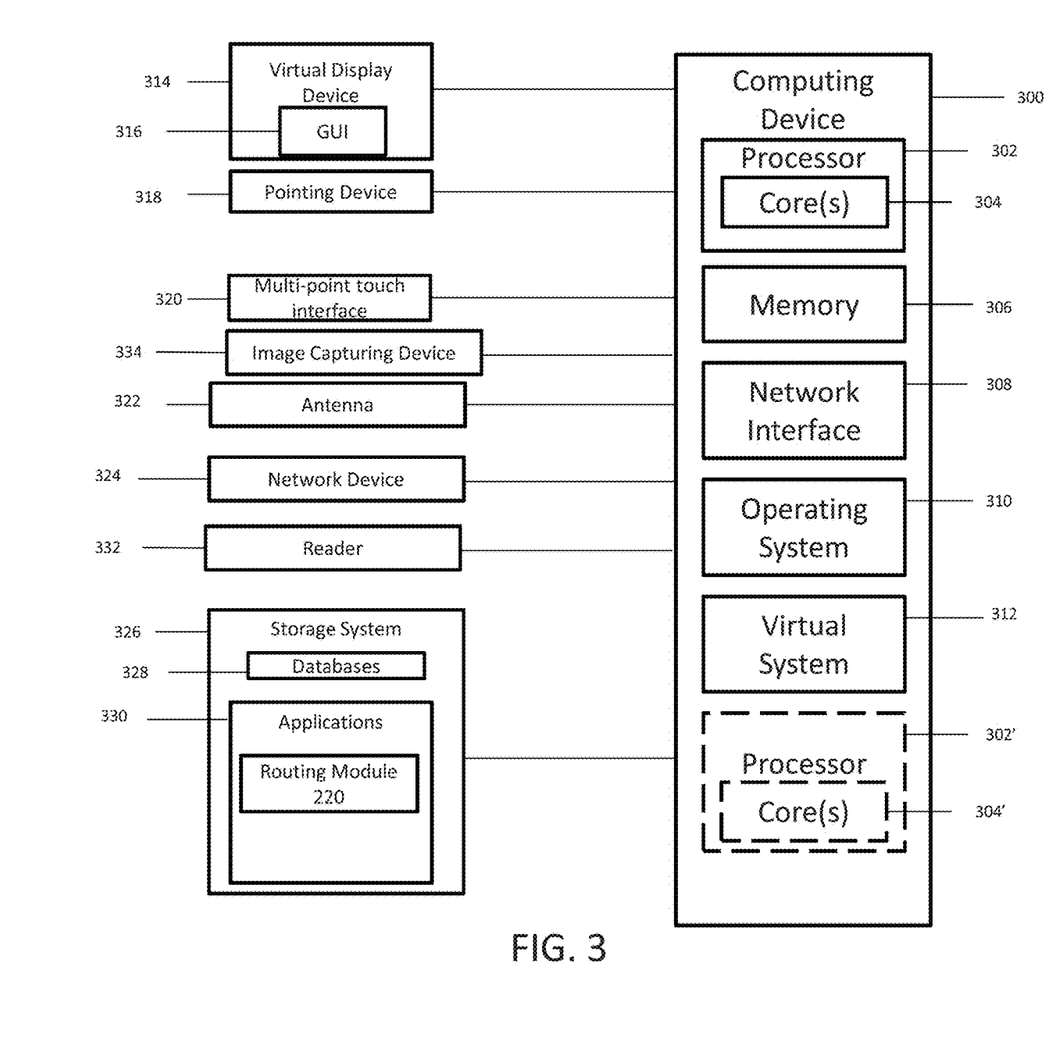
FIG. 3 is a block diagrams illustrating of an exemplary computing device in accordance with exemplary embodiments of the present disclosure.

FIG. 3 is a block diagram of an example computing device for implementing exemplary embodiments of the present disclosure. Embodiments of the computing device 300 can implement embodiments of the routing engine. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the routing engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an image capturing device 334 and an scanner 332.

The computing device 300 may also include one or more computer storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding physical objects disposed at a facility and can be indexed via the decoded identifier retrieved by the identifier reader and information about the facility in which the physical objects are disposed. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
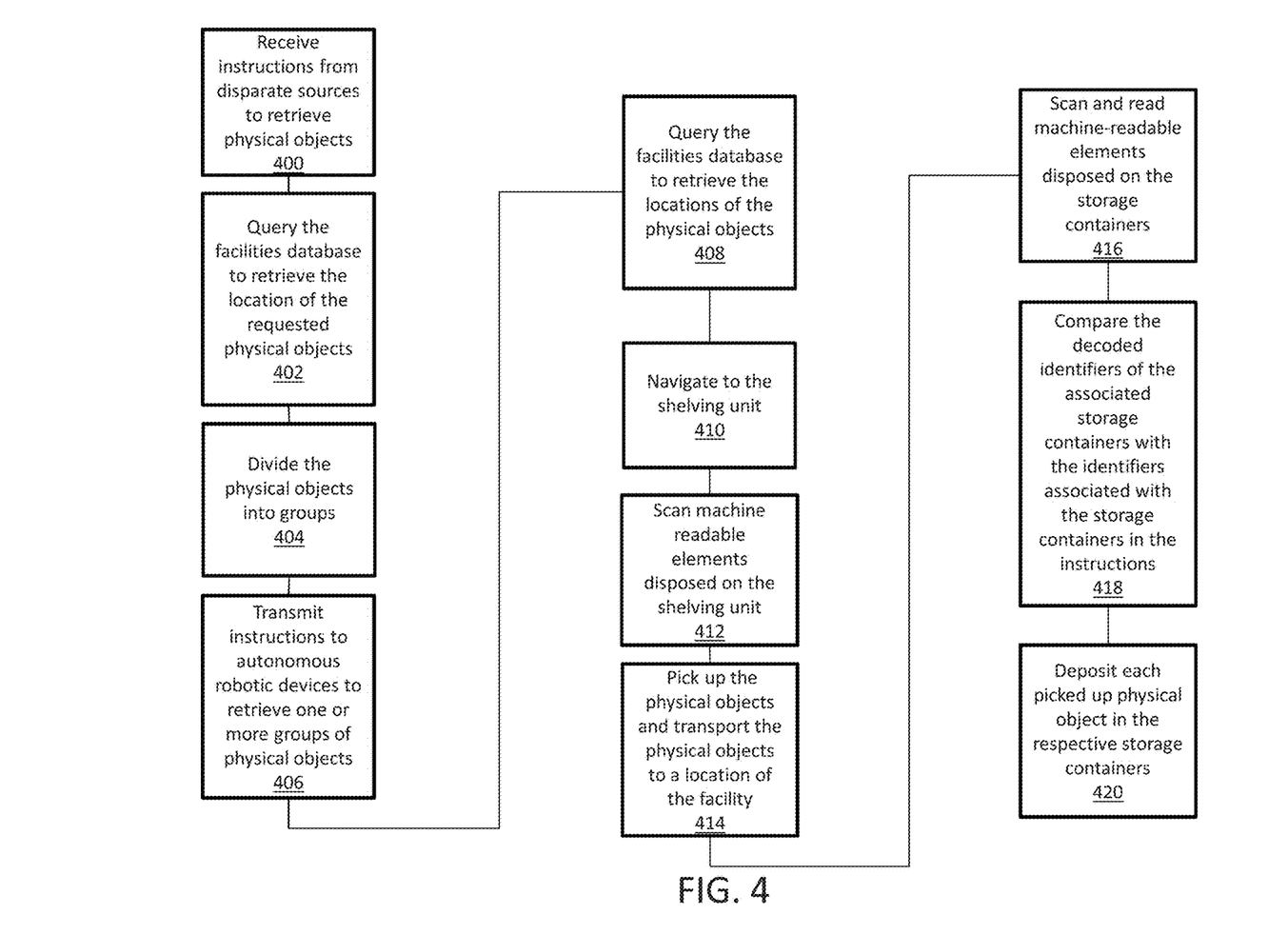
FIG. 4 is a flowchart illustrating an exemplary process in accordance with exemplary embodiments of the present disclosure.

FIG. 4 is a flowchart illustrating the process of the automated robotic fulfillment system according to exemplary embodiment. In operation 400, a computing system (e.g. computing system 200 as shown in FIG. 2) can receive instructions from disparate sources (e.g. disparate sources 240 as shown in FIG. 2) to retrieve physical objects (e.g. physical objects 104-110, 152, 156 and 162 as shown in FIGS. 1A-B) from a facility. The computing system can execute the routing engine (e.g. routing engine 220 as shown in FIG. 2) in response to receiving the instructions. In operation 402, the routing engine can query a facilities database (e.g., a facilities database 225 shown in FIG. 2) to retrieve the location of the requested physical objects. The routing engine can query the physical objects database (e.g., physical objects database 235 as shown in FIG. 2) to retrieve a set of attributes associated with the requested physical objects. In operation 404, the routing engine can divide the physical objects into groups based on the location and/or set of attributes associated with the physical objects.

In operation 406, the routing engine can transmit instructions to various autonomous robotic devices (e.g. autonomous robotic devices 120, 150 and 260 as shown in FIGS. 1A-B and 2) disposed in a facility to retrieve one or more groups of physical objects and deposit the physical objects in one or more storage containers (e.g. storage containers 154, 164 and 232 as shown in FIGS. 1B and 2). The instructions can include the identifiers associated with the physical objects and identifiers associated with the storage containers in which to deposit the physical objects. In operation 408, the autonomous robot device can query the facilities database to retrieve the locations of the physical objects within the facility. In operation 410, the autonomous robot device can navigate to the shelving unit (e.g. shelving unit 102 and 230 as shown in FIGS. 1A and 2) in which the physical objects are disposed. In operation 412, the autonomous robot device can scan machine readable elements disposed on the shelving unit, encoded with identifiers associated with the requested physical objects. The autonomous robot device can query the physical objects database using the identifiers to retrieve a set of stored attributes associated with the physical objects. The autonomous robot device can capture an image of the physical objects and extract a set of attributes associated with the physical objects the image. The autonomous robot device can compare the stored set of attributes associated with the physical objects and the extracted set of attributes associated with the physical objects to confirm the physical objects disposed on the shelf is the same physical object the autonomous robot device was instructed to pick up.

In operation 414, the autonomous robot device can pick up the physical objects and transport the physical objects to a location of the facility including storage containers. Sensors (e.g. sensors 142, 188 and 245 as shown in FIGS. 1A-1C and 2, respectively) can be disposed at the shelving unit in which the physical objects are disposed. The sensors can detect a change in weight, temperature or moisture in response to the physical objects being picked up by the autonomous robot device. The sensors can encode the change in weight, temperature and/or moisture into electrical signals and transmit the electrical signals to the routing engine. In some embodiments, the routing engine can determine the autonomous robot device has picked up the incorrect, damaged or decomposing physical objects based on the decoded electrical signals. The routing engine can redirect the autonomous robot device to pick up different physical objects in response to determining the picked up objects are incorrect, damaged and/or decomposing. In operation 416, the autonomous robot device can scan and read machine-readable elements (e.g. machine-readable elements 166 168 as shown in FIG. 1B) disposed on the storage containers. The machine readable elements can be encoded with identifiers associated with the storage containers. In operation 418, the autonomous robot device can compare the decoded identifiers of the associated storage containers with the identifiers associated with the storage containers in the instructions. The autonomous robot device can determine which physical objects among the physical objects the autonomous robot device has picked up, are associated with which storage containers. In operation 420, the autonomous robot device can deposit each picked up physical object in the respective storage containers. Sensors can be disposed in the storage containers. The sensors can detect a change in weight, temperature and/or moisture in response to the autonomous robot device depositing the physical objects in the storage containers. The sensors can encode the change in weight, temperature and/or moisture into electrical signals and transmit the electrical signals to the routing engine. The routing engine can determine that the deposited physical object is deposited in the incorrect storage container, the physical object is incorrect, the physical object is damaged and/or the physical object is decomposing. The routing engine can direct the autonomous robot device to remove one of the physical objects from the storage container. In some embodiments, the autonomous robot device can determine the storage container is full and/or contains the required physical objects and can carry the storage container to a different location in the facility.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An automated fulfillment system, the system comprising:
    a computing system programmed to receive requests from disparate sources for physical objects disposed at one or more locations in a facility, combine the requests, and group the physical objects in the requests based on object types or expected object locations;
    a database communicatively coupled to the computing system, storing information associated with the physical objects;
    a plurality of autonomous robot devices in selective communication with the computing system and the database via a communications network, at least one of the plurality of autonomous robot devices including a controller, a drive motor, an articulated arm, a reader and an image capturing device,
    the at least one of the autonomous robot devices is configured to:
        (i) receive instructions from the computing system to retrieve a first group of the physical objects based on one or more identifiers associated with the physical objects in the first group of physical objects,
        (ii) query the database using the one or more identifiers associated with the physical objects in the first group to retrieve information associated with the first group of the physical objects,
        (iii) determine a first set of object locations of the physical objects in the first group based on the retrieved information,
        (iv) navigate autonomously through the facility to the first set of object locations in response to operation of the drive motor by the controller,
        (v) locate and scan one or more machine readable elements at the first set of object locations, the one or more machine-readable elements being encoded with the one or more identifiers,
        (vi) detect, via at least one image captured by the image capture device, that the first group of physical objects are disposed at the first set of locations,
        (vii) pick up a first quantity of physical objects in the first group using the articulated arm, and
        (viii) deposit the physical objects in the first group in storage containers, wherein each of the storage containers corresponds to one of the requests and the at least one of the autonomous robot devices deposits the physical objects in the first group in the storage containers based on the requests to which the physical objects are associated;
    a first plurality of sensors disposed at the first set of object locations, the first plurality of sensors configured to determine that the at least one autonomous robot devices retrieved the physical objects in the first group; and
    a second plurality of sensors disposed in the storage containers, the second plurality of sensors configured to determine that the at least one of the autonomous robot devices correctly deposited the physical objects in the storage containers.

2. The system in claim 1, wherein the at least one of the autonomous robot further devices configured to:
    carry the first quantity of the first quantity of physical objects in the first group;
    navigate to the storage containers located at a second location in the facility;
    deposit a first subset of the first quantity of physical objects in the first group in a first one of the storage containers; and
    deposit a second subset of the first quantity of physical objects in the first group in a second one of the storage containers.

3. The system in claim 2, wherein the at least one of the autonomous robot devices is further configured to transport the first one of the storage containers and the second one of the storage containers to a specified location in the facility.

4. The system in claim 2, further comprising a plurality of shelving units disposed in the facility and wherein the first quantity of physical objects in the first group is disposed on the plurality of shelving units.

5. The system in claim 4, wherein the first plurality of sensors is disposed in or about the plurality of shelving units.

6. The system in claim 4, wherein the first plurality of sensors are configured to detect a change in a first set of attributes associated with the shelving units when the first quantity of physical objects in the first group is removed from the plurality of shelving units, and transmit the first set of attributes to the computing system.

7. The system in claim 6, wherein the computing system updates the database in response to receiving the first set of attributes.

8. The system in claim 1, wherein the second plurality of sensors is disposed in a bottom surface of the storage containers.

9. The system in claim 8, wherein the second plurality of sensors is configured to detect a first set of attributes associated with a first subset of the first quantity of physical objects in the first group in a first one of the storage containers, detect a second set of attributes associated with a second subset of the first quantity of physical objects in the first group in a second one of the storage containers, and transmit the first set of attributes to the computing system.

10. The system in claim 9, wherein the computing system is further programmed to update the database in response to receiving the first and second set of attributes.

11. An automated fulfillment method, the method comprising:
receiving, via a computing system, requests from disparate sources for physical objects disposed at one or more locations in a facility;
combining, via the computing system, the requests;
grouping, via the computing system, the physical objects in the requests based on object types or expected object locations;
receiving instructions from the computing system to retrieve a first group of the physical objects based on one or more identifiers associated with the physical objects in the first group of physical objects via at least one autonomous robot device of a plurality of autonomous robot devices, the at least one autonomous robot device is in selective communication with the computing system via a communications network, and the at least one autonomous robot device includes a controller, a drive motor, an articulated arm, a reader and an image capturing device;
querying, via the at least one autonomous robot device, a database operatively coupled to the computing system and the plurality of autonomous robot devices, using the one or more identifiers associated with the physical objects in the first group to retrieve information associated with the first group of physical objects;
determining, via the at least one autonomous robot device, a first set of object locations of the physical objects in the first group based on the retrieved information;
navigating, via the at least one autonomous robot device, autonomously through the facility to the first set of object locations in response to operation of the drive motor by the controller;
locating and scanning, via the at least one autonomous robot device, one or more machine readable elements disposed at the first set of object locations, the machine-readable elements being encoded with the one or more identifiers;
detecting, via at least one image captured by the image capture device of the at least one autonomous robot device, that the first group of physical objects is disposed at the first set of locations;
picking up, via the at least one autonomous robot device, a first quantity of physical objects in the first group using the articulated arm;
depositing, via the at least one autonomous robot device, the physical objects in the first group in storage containers, wherein each of the storage containers corresponds to one of the requests, and the at least one autonomous robot device deposits the physical objects in the first group in the storage containers based on the requests to which the physical objects are associated;
determining, via a first plurality of sensors disposed at the first set of object locations and operatively coupled to the computing system, that the at least one autonomous robot device retrieved the physical objects in the first group; and
determining, via a second plurality of sensors disposed at the storage containers and operatively coupled to the computing system, that the at least one autonomous robot device correctly deposited the physical objects in the storage containers.

12. The method in claim 11, wherein the instructions from the computing system include one or more identifiers associated with the physical objects in the first group of physical objects.

13. The method in claim 12, further comprising:
carrying, via the at least one autonomous robot device, the first quantity of the first quantity of physical objects in the first group;
navigating the at least one autonomous robot device to the storage containers located at a second location in the facility;
depositing, via the at least one autonomous robot device, a first subset of the first quantity of physical objects in the first group in a first one of the storage containers; and
depositing, via the at least one autonomous robot device, a second subset of the first quantity of physical objects in the first group in a second one of the storage containers.

14. The method in claim 13, further comprising transporting, via the at least one autonomous robot device, the first one of the storage containers and the second one of the storage containers to a specified location in the facility.

15. The method in claim 13, wherein the first quantity of physical objects in the first group is disposed on a plurality of shelving units disposed in the facility before being retrieved by the at least one autonomous robot device.

16. The method in claim 15, wherein the first plurality of sensors is disposed in or about the plurality of shelving units.

17. The method in claim 16, further comprising:
detecting, via the first plurality of sensors, a change in a first set of attributes associated with the shelving units when the first quantity of physical objects in the first group is removed from the plurality of shelving units; and
transmitting, via the first plurality of sensors, the first set of attributes to the computing system.

18. The method in claim 17, further comprising updating, via the computing system, the database in response to receiving the first set of attributes.

19. The method in claim 12, wherein the second plurality of sensors is disposed in a bottom surface of the storage containers.

20. The method in claim 19, further comprising:
   detecting, via the second plurality of sensors, a first set of attributes associated with a first subset of the first quantity of physical objects in the first group in a first one of the storage containers;
   detecting, via the second plurality of sensors, a second set of attributes associated with a second subset of the first quantity of physical objects in the first group in a second one of the storage containers; and
   transmitting, via the second plurality of sensors, the first and second set of attributes the computing system.

* * * * *